INVENTORS
ADOLF BELZNER
GEORG ZORN
BY Raymond P. Wallace
AGENT

United States Patent Office 3,540,815
Patented Nov. 17, 1970

3,540,815
SEALING MEANS FOR ROTARY INTERNAL
COMBUSTION ENGINES
Adolf Belzner and Georg Zorn, Heilbronn-Neckargartach,
Germany, assignors to NSU Motorenwerke Aktiengesellschaft, Neckarsulm, Germany, and Wankel
G.m.b.H., Landau-Bodensee, Germany
Filed June 10, 1969, Ser. No. 831,870
Int. Cl. F01c 1/02, 19/00, 19/12
U.S. Cl. 418—61                                    5 Claims

ABSTRACT OF THE DISCLOSURE

A rotary engine of the trochoidal type, having a fluid-cooled rotor, with provision for sealing against leakage of internal rotor coolant into the working chambers during both operating and standstill conditions.

BACKGROUND OF THE INVENTION

This invention relates to rotary internal combustion engines of the trochoidal type, and more particularly to a method and means for preventing the leakage of rotor coolant into the working chambers of the engine by gas pressure during operation, and by spring pressure during shutdown periods.

In U.S. Pat. No. 3,323,712 there is shown an engine of this type, wherein sealing of the internal rotor oil or other coolant during operation is accomplished by an outwardly acting sealing ring positioned in a groove surrounding a portion of the eccentric on which the rotor turns. During operation, gas bleeding past the gas seals into the spaces between the rotor end faces and the housing end walls presses the seal rings against their groove walls, preventing coolant leakage into those spaces. During shutdown the seal rings cease to act in this manner, but there is in each rotor end face a further, radially outwardly positioned groove in which is disposed a scraper ring with a spring behind it to press it against the end wall when the motor is not running, therefore preventing leakage of the coolant into the operating chambers. However, to allow gas to bleed past the scraper ring during operation in order to press the seal ring against its groove wall, the scraper ring is designed with a beveled face for gas to act on, which lifts it slightly off the end wall during operation.

The design of such a scraper ring for such a dual function is very critical. Its spring must be sufficiently strong to hold it tight to the end wall during shutdown. On the other hand, the beveled face must be of just such an angle and just such surface areas as to slightly overcome the spring pressure while running. Since gas pressure varies greatly in accordance with engine load and speed, it has been very difficult to provide a scraper ring which will function satisfactorily at all operating conditions. The present invention provides a scraper ring of different type in combination with other engine modifications, which overcome this limitation.

SUMMARY

This invention provides a scraper ring which may have either a flat scraping face, or a beveled face to give a sharp scraping edge, but in either case does not rely on gas pressure acting on a bevel to lift it off the end wall. Instead, there is provided in each end wall a small gas bypass recess, which periodically places the gas chambers intermittently into communication with the annular space inside the scraper ring, thus providing the necessary gas pressure to hold the seal ring against its groove wall during operation. Therefore, the spring pressure on the scraper ring can be made sufficiently strong to hold it in contact with the housing end wall at all times, without the necessity of a complex design problem in balancing spring pressure, gas pressure, and areas. The bypass recesses are disposed at such location in the end walls that no coolant flow can take place through them during shutdown.

It is an object of this invention to provide means of sealing a rotary engine against leakage of rotor cooling fluid both during operation and shutdown.

It is another object to provide a rotary engine having a fluid cooled rotor with a sealing system against coolant leakage activated by gas pressure during operation and spring pressure during shutdown.

Other objects and advantages will become apparent on reading the following specification in connection with the appended drawings.

DESCRIPTION OF A PREFERRED EMBODIMENT

Figure 1:
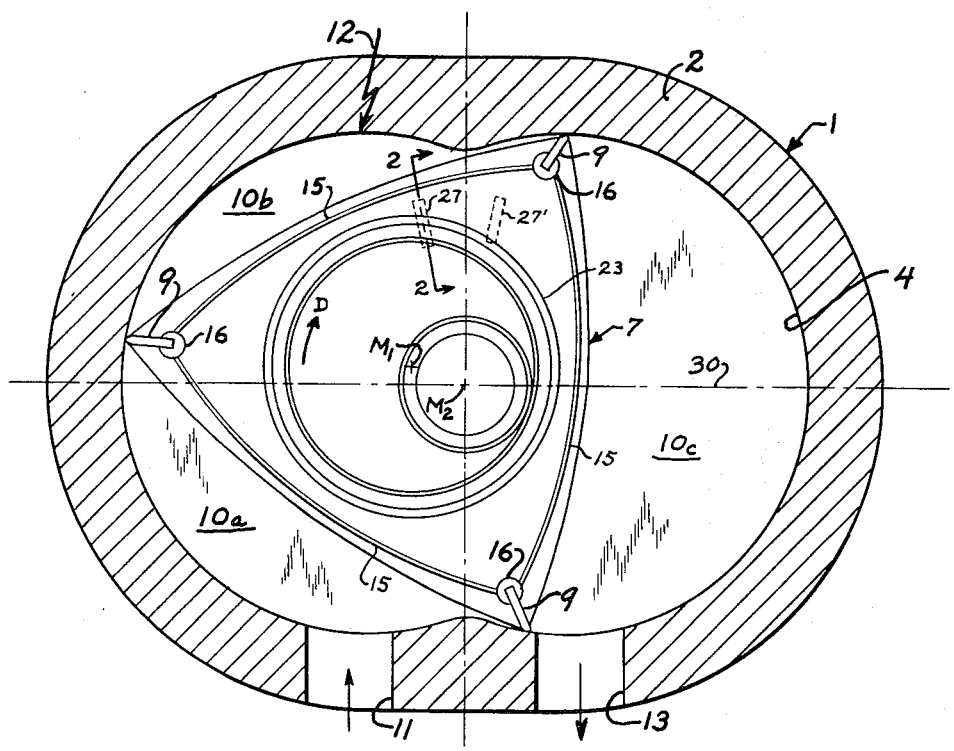
FIG. 1 shows a view in the axial direction of a trochoidal engine with the near end wall removed.
Figure 2:
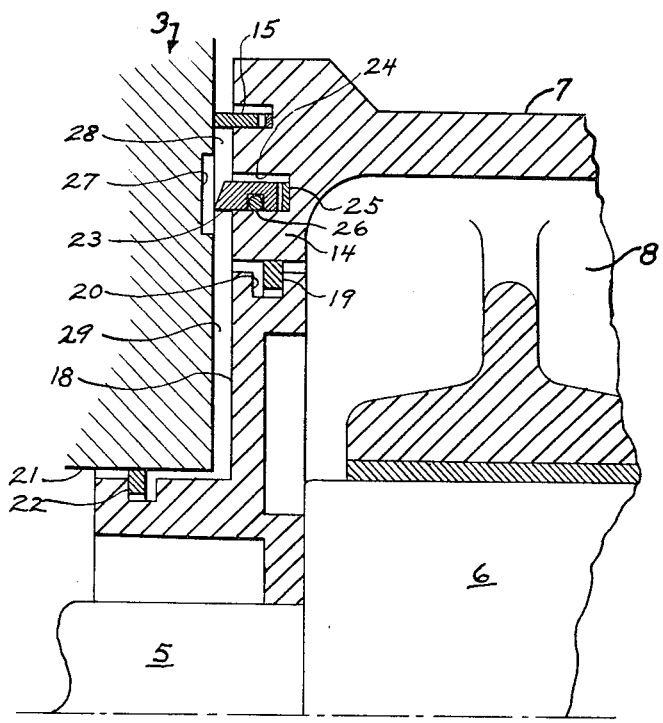
FIG. 2 is a fragmentary cross-sectional elevation taken on line 2—2 of FIG. 1, showing details of the invention.

In FIGS. 1 and 2 there is illustrated a four-cycle rotary engine 1 having a peripheral housing 2 and two parallel end walls 3, of which only further one is shown. The inner peripheral surface 4 is in the form of a two-lobed epitrochoid. A shaft 5 transpierces the end walls, and has within the housing an eccentric portion 6 on which is rotatably mounted a fluid-cooled, generally triangular rotor 7. The rotor has internal hollow spaces 8 through which flows a cooling fluid. The rotor 7 is provided at each of its apexes with an apex seal 9, which apex seals during rotation of the rotor slide continuously along the inner peripheral surface 4. Through this action there are formed three variable-volume chambers 10a, 10b, and 10c. In the peripheral housing 2 are disposed an induction channel 11, a spark plug 12 (shown schematically), and an exhaust channel 13. Thereby a four-cycle process takes place in each operative chamber, with suitable offset of the phases. In the illustrated position of the rotor 7 the operative chamber 10a is in its induction cycle, chamber 10b is in its compression cycle, and chamber 10c is in its exhaust cycle.

Each end face 14 of the rotor carries gas seals, which comprise the sealing strips 15 positioned in grooves near the periphery of the rotor, and pins 16 which receive the ends of the apex seals 9. These elements are pressed by springs against the inner surfaces of the adjacent end walls 3 of the housing.

For the purpose of preventing leakage of cooling fluid out of the hollow spaces 8 within the rotor, there is provided at least one disk 18 which is concentric with the axis of rotation $M_1$ of the rotor and which turns with the shaft. The disk has a peripheral groove 20 in which is positioned at least one seal ring 19 which is formed as an outwardly acting split piston ring with a gas-tight joint. A bore through the end wall 14 of the rotor surrounds groove 20 and seal ring 19. Gas bled from the operative chambers past seals 15 by means to be described enters the space 29 between the rotor and the housing end walls, acting radially outwardly on seal ring 19 to expand it against the rotor bore, and axially inwardly against the seal ring to hold it tight against the inner wall of its groove 20, thereby sealing the coolant within the interior of the rotor.

The housing end wall 3 also contains a bore 21, and disk 18 has a portion entering the end wall bore and having a further groove in which is positioned a similar seal ring 22. Ring 22 also acts in response to gas pressure and is held against the axial outward wall of its groove and against the bore to seal against the entry of lubricating oil from the outside into space 29.

Because the seal rings 19 and 22 bear sealingly against their groove walls only during running, when operating gases pass over the gas seals 15, it is apparent that the rings do not provide coolant sealing when the engine is not operating. In that case it would be possible for coolant to pass out of the rotor hollow spaces 8, through the gap 29 between the rotor end face and the end wall, past the gas seals, and into the operating chambers. This would make starting of the engine difficult, and cooling fluid would be lost. In the prior art Pat. No. 3,323,712 an attempt was made to correct this condition by the use of the beveled spring-pressed rings referred to previously.

In the present invention there is provided in each rotor end face a groove 24 radially outward from seal rings 19 and radially inward from gas seals 15. In each of the grooves 24 there is positioned a closed scraper ring 23. In the groove behind the scraper ring is a spring 25 which presses the ring axially outwardly so that it cooperates sealingly with the inner face of the end wall 3. The ring 23 has an annular groove in its inner periphery, in which is disposed an O-ring 26 which cooperates sealingly with the radially inner wall of the groove 24. Scraper ring 23 may have a beveled face as shown to provide a better scraping edge or may have a flat scraping face, but in any case the bevel is not of such design that gas pressure would lift the ring from its scraping relation with the end wall. Rather, gas pressure passing the gas seals during operation is exerted in the groove 24 behind the scraper ring to hold it in sealing relation against the end wall.

To make it possible for leakage gases to enter the space 29, radially inside the scraper ring 23, there is provided in the inner face of the housing end wall 3 a recess 27, which is disposed in that region of the engine wherein the compression cycle occurs intermittently. That is, as shown in FIG. 1, recess 27 is disposed near that cusp of the epitrochoid which is opposite the intake and exhaust ports, and somewhat upstream from the minor diameter of the epitrochoid. Recess 27 is so positioned and of such radial extent that it intermittently bridges the region 28 just inside the gas seals 15 and the region 29 inside the scraper ring, as the scraper ring slides across the recess. Thus, during rotation of the rotor 7 the scraper ring 23 periodically crosses the recess so that compression gas which has leaked past the gas seals is transferred to space 29 inside the scraper so that it may act on seal rings 19 and 22.

Alternatively, the recess may also be disposed in that region of the engine in which the expansion cycle occurs intermittently. That position of the recess is indicated in FIG. 1 by 27', and in that case the recess 27' is also near the epitrochoidal cusp, but slightly downstream from the minor diameter. The recess 27 or 27' is shown much enlarged in the drawing for clarity of illustration, and in practice its cross-section need be no more than a few square millimeters. In either case it lies wholly inside the inner envelope of the gas seals so that it is never exposed to an operating chamber.

The recess 27 or 27' is preferably disposed above the horizontal plane 30 passing through the axis $M_2$ of rotation of the shaft 5, to insure that when the engine is stopped no passage of cooling fluid over the scraper ring 23 may occur, even when the rotor 7 chances to be situated so that the recess 27 or 27' bridges over ring 23. If the engine is installed at 90° clockwise relative to the position illustrated, it is preferable to have recess 27 which transfers compression gas; but in the case of installation 90° counter-clockwise from the illustrated position, recess 27' transferring expansion gas would be used.

Although the details of the sealing arrangement are shown in FIG. 2 for only one rotor end face and housing end wall, an arrangement on the same principle would also be used at the other side, unless pressure equilibrium is obtained at the other rotor end face by axial bores through portions of the rotor.

What is claimed is:

1. A rotary combustion engine of trochoidal type, having a peripheral housing and a pair of parallel end walls, a shaft transpiercing the end walls and having an eccentric portion within the housing, a hollow fluid-cooled rotor rotatably mounted on the eccentric portion and defining a plurality of variable-volume chambers with the housing, the rotor bearing on each end face gas seals which cooperate sealingly with the inner faces of the housing end walls, at least one disk rotatable with the shaft and concentric with the eccentric portion, and a seal ring positioned in a peripheral groove of the disk which seal ring is responsive to gas pressure passing the gas seals to cooperate sealingly with the disk groove and with the rotor to seal cooling fluid within the hollow rotor, wherein the improvement comprises:

(a) the rotor having in its end face a groove surrounding the disk and positioned radially inwardly from the gas seals;

(b) a scraper ring disposed in the rotor groove and having a spring in the groove bottom under the scraper ring pressing it into sealing contact with the adjacent housing end wall; and (c) the end wall having in its inner face a recess which during engine operation is periodically slid over by the scraper ring to provide intermittent communication between the space inside the scraper ring and the space between the scraper ring and the gas seals.

2. A rotary combustion engine as recited in claim 1, wherein the recess is disposed inside the inner envelope curve of the gas seals.

3. A rotary combustion engine as recited in claim 1, wherein the recess is disposed above a horizontal plane passing through the axis of shaft rotation.

4. A rotary combustion engine as recited in claim 3, wherein the recess is disposed in the compression zone upstream from the minor diameter of the epitrochoidal housing.

5. A rotary combustion engine as recited in claim 3, wherein the recess is disposed in the expansion zone downstream from the minor diameter of the epitrochoidal housing.

References Cited

UNITED STATES PATENTS

| 3,142,440 | 7/1964 | Schagg. |
| 3,165,259 | 1/1965 | Muller et al. |
| 3,323,712 | 6/1967 | Froede et al. |

CARLTON R. CROYLE, Primary Examiner

J. VRABLIK, Assistant Examiner

U.S. Cl. X.R.

123—8; 418—81, 144